United States Patent [19]
Murty et al.

[11] Patent Number: 5,291,106
[45] Date of Patent: Mar. 1, 1994

[54] SINGLE CURRENT REGULATOR FOR CONTROLLED MOTORING AND BRAKING OF A DC-FED ELECTRIC MOTOR

[75] Inventors: Balarama V. Murty, West Bloomfield; Chandra S. Namuduri, Sterling Heights, both of Mich.

[73] Assignee: General Motors Corporation, Detroit, Mich.

[21] Appl. No.: 980,052

[22] Filed: Nov. 23, 1992

[51] Int. Cl.$^5$ .............................................. H02S 3/00
[52] U.S. Cl. ...................................... 318/375; 318/370
[58] Field of Search .................. 318/268, 269, 59, 60, 318/375, 376, 362, 369, 370, 377, 379, 139; 307/64–67, 85

[56] References Cited

U.S. PATENT DOCUMENTS

| | | | |
|---|---|---|---|
| 3,577,055 | 5/1971 | Hermansson | 318/370 |
| 3,876,920 | 4/1975 | Meissen et al. | 318/370 |
| 4,173,732 | 11/1979 | Anderson | 318/375 |
| 4,216,420 | 8/1980 | Jinbo et al. | 318/370 |
| 4,423,363 | 12/1983 | Clark et al. | 318/375 |
| 4,554,999 | 11/1985 | Kamaike | 307/66 X |
| 4,815,575 | 3/1989 | Murty | 188/299 |
| 5,034,669 | 7/1991 | Sako et al. | 318/376 |
| 5,091,679 | 2/1992 | Murty et al. | 318/153 |
| 5,127,085 | 6/1992 | Becker et al. | 388/903 |

*Primary Examiner*—Jonathan Wysocki
*Attorney, Agent, or Firm*—Mark A. Navarre; Anthony Luke Simon

[57] ABSTRACT

A control system for an electric machine powered from a DC source, wherein controlled motoring and controlled braking are achieved with a single current regulator control, even when the DC source cannot accept charging current and/or the induced motor voltage exceeds the DC bus voltage. The motor control circuit comprises a DC source connected to a DC bus, a current control circuit for modulating switching devices connected across the DC bus, an energy exchange capacitor connected across the DC bus, a load resistor, a switching circuit effective when activated to interrupt a connection between the DC source and the DC bus and to connect the load resistor across the DC bus in parallel with the capacitor, and a logic circuit for activating the switching circuit during motor braking under conditions for which the modulation of the switching devices is ineffective to control the braking current.

10 Claims, 5 Drawing Sheets

SINGLE CURRENT REGULATOR FOR CONTROLLED MOTORING AND BRAKING OF A DC-FED ELECTRIC MOTOR

This invention relates to current control of an electric machine powered from a rechargeable DC source, and more particularly, to a circuit arrangement which enables continuous controlled motoring and braking of the machine with a single current regulator.

BACKGROUND OF THE INVENTION

Numerous applications require controlled motoring and braking of an electric machine. In automotive and other applications powered by a rechargeable DC source, such as a storage battery, the control requires at least a pair of switching devices connected across the DC bus for supplying regulated current to the armature windings of the machine during motoring, and at least a pair of associated rectifiers for returning generated current to the battery during braking. When the generated voltage is less than the battery voltage, the switching devices may be modulated to aid the induced voltage in the manner of a boost converter. Typical automotive applications include propulsion and active suspension; see, for example, Murty et al. U.S. Pat. No. 5,091,679, issued on Feb. 25, 1992, and assigned to the assignee of the present invention.

Under certain conditions, such as when the battery is fully charged and/or when the motor speed is such that the induced voltage (back-EMF) exceeds the DC bus voltage, the braking force cannot be conveniently controlled. In the latter case, the rectifiers conduct almost continuously since the DC bus voltage is limited substantially to the terminal voltage of the battery. In the case of the fully charged battery, the generated current must be supplied to an alternate load, such as a bank of load resistors connected in parallel with the battery, as in the above-referenced U.S. Pat. No. 5,091,679.

In applications where controlled braking is essential, it is known to regulate the generated current by modulating the conduction of a resistive load circuit connected across the DC bus. See, for example, the braking control disclosed in Murty et al. U.S. Pat. No. 4,815,575, issued on Mar. 28, 1989, and assigned to the assignee of the present invention. In an application requiring both motoring and braking, however, this approach requires separate current controllers for motoring and braking, and circuitry for controlling transitions between the two modes of current control.

SUMMARY OF THE PRESENT INVENTION

The present invention is directed to an improved control apparatus for a DC-fed electric machine, wherein controlled motoring and controlled braking are achieved with a single current regulator control, even when the DC source cannot accept charging current and/or the back-EMF of the machine exceeds the DC bus voltage.

The motor control circuit according to this invention comprises a current control circuit for modulating the DC bus switching devices, an energy exchange capacitor connected across the DC bus, a load resistor, a mode switching circuit effective when activated to interrupt a connection between the DC source and the DC bus and to connect the load resistor across the DC bus in parallel with the capacitor, and a controller for activating the mode switching circuit during braking under conditions for which the braking current cannot be controlled through modulation of the DC bus switching devices.

Once the mode switching circuit has been activated, the capacitor operates as a variable voltage storage element and the motor braking current can be effectively regulated via modulation of the DC bus switching devices. Moreover, the activation of the mode switching circuit is transparent to the current control circuitry, obviating the need for special transition current control circuits.

In the illustrated embodiment, the mode switching circuit is activated whenever the DC bus voltage rises above a preset level or the armature winding current error exceeds a given value. In this way, the controller advantageously operates to activate the mode switching circuit in the event of an unexpected battery disconnect or a failure in the current control circuit or DC bus switching devices. Under such conditions, the load resistor operates to provide a minimum braking torque which varies with the motor velocity.

DETAILED DESCRIPTION OF THE DRAWINGS

Figure 1:
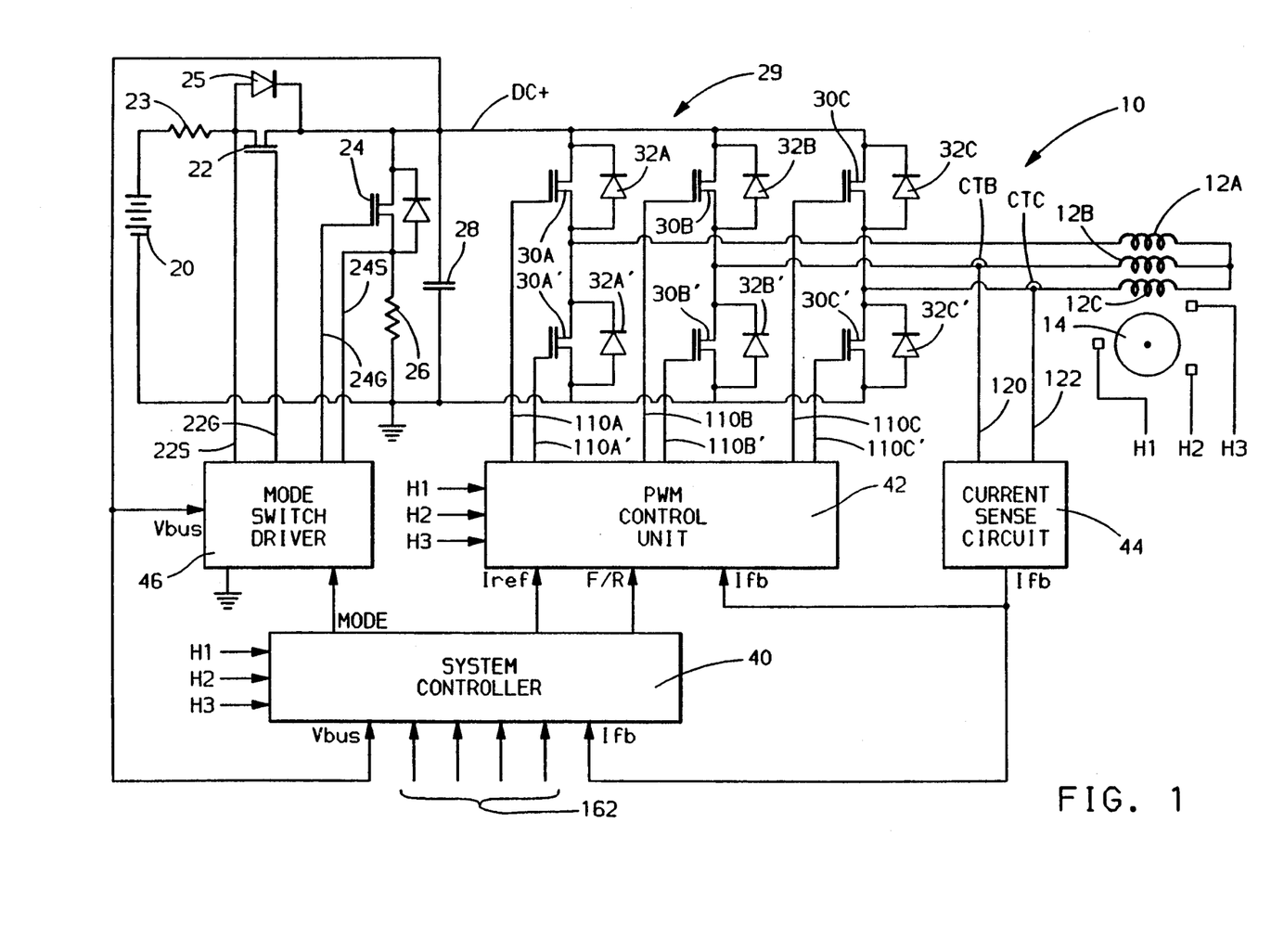
FIG. 1 is a schematic diagram of a motor control system according to this invention as applied to a three-phase brushless motor, including Current Sense Circuit, a PWM Control Unit, a Mode Switch Driver and a computer-based System Controller.

Referring to FIG. 1, the control of this invention is described in the environment of a control system including a three-phase brushless DC machine, generally designated by the reference numeral 10. The machine 10 comprises a set of three phase armature windings 12A, 12B, 12C disposed in a stator (not shown) about permanent magnet rotor 14. A set of conventional Hall effect sensors provide rotor position information signals H1, H2 and H3 for control purposes.

The current in armature windings 12A–12C is controlled through the agency of a storage battery 20, mode switching power transistors 22 and 24, a load resistor 26, an energy exchange capacitor 28 and a full-bridge transistor inverter 29. Storage battery 20 serves the function of a rechargeable source of DC which, in the normal mode of operation, is connected via negative temperature coefficient thermistor 23, mode switching transistor 22 and diode 25 to a DC bus, defined by line DC+ and the circuit ground. As described below, the mode switching transistors 22 and 24 are controlled in complementary fashion so that in an override mode of operation when the DC bus voltage exceeds a battery voltage limit, the battery charging path is interrupted, and instead, the load resistor 26 is connected across the DC bus. In this mode, the capacitor 28 operates as a variable voltage DC source.

The inverter 29 includes three pairs (30A, 30A'; 30B, 30B'; 30C, 30C') of power transistors connected across the DC bus, each armature winding 12A-12C being connected to a junction between a respective pair of transistors. The inverter 29 also includes a reverse polarity or freewheeling diode 32A, 32A', 32B, 32B', 32C and 32C' connected in parallel with each of the transistors 30A, 30A', 30B, 30B', 30C and 30C' as shown, effectively defining a full wave bridge rectifier connected across the DC bus.

The control of the mode switching and inverter transistors is performed by a control system comprising a computer-based System Controller 40, a PWM Control Unit 42, a Current Sense Circuit 44, a Mode Switch Driver 46 and various sensor elements. The PWM Control Unit 42 and the Mode Switch Driver 46 interface directly with the inverter and mode switching transistors, respectively.

The Mode Switch Driver 46, described below in reference to FIG. 2, receives a 12-volt operating voltage (+12 V) from an auxiliary source (not shown), and controls the conduction of mode switching transistors 22 and 24 via lines 22G, 22S, 24G, 24S in response to (1) the voltage Vbus across the DC bus and (2) a MODE control signal developed by computer-based System Controller 40.

Figure 2:
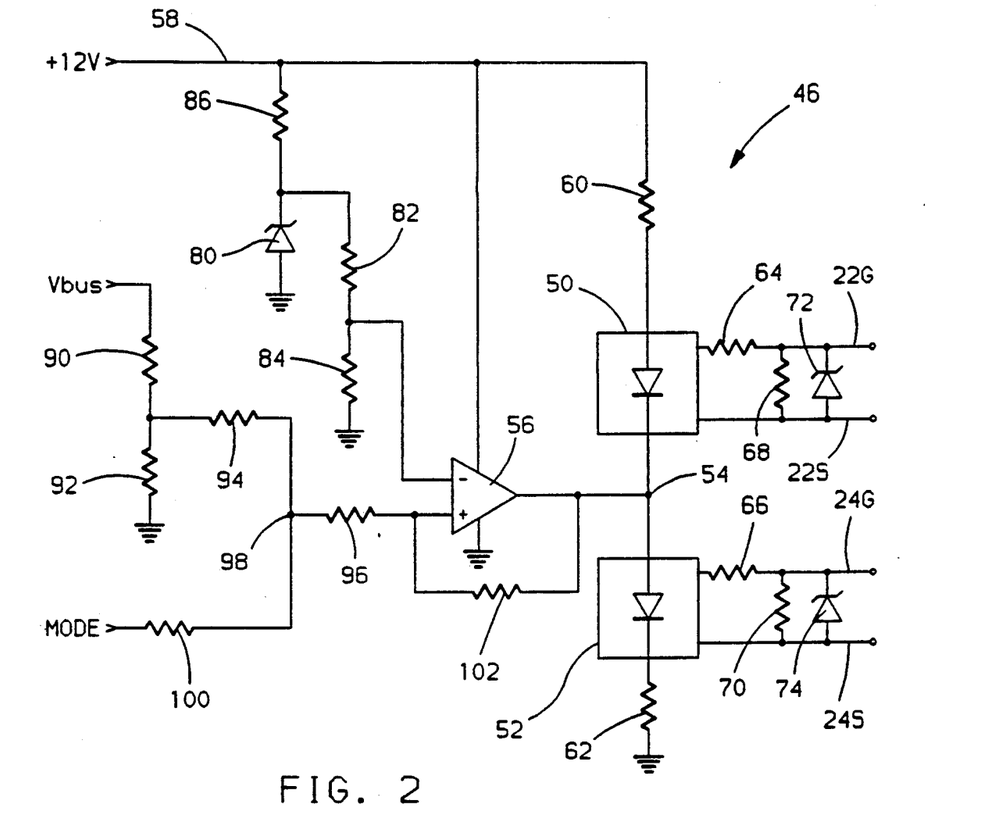
FIG. 2 is a circuit diagram of the Mode Switch Driver of FIG. 1.

Referring to FIG. 2, the Mode Switch Driver 46 comprises upper and lower optically coupled drivers 50 and 52 having input terminals mutually connected to a junction 54 and a comparator 56. The anode terminal of driver 50 is connected to the +12 V line 58 via resistor 60, and the cathode terminal of driver 52 is connected to a common ground via resistor 62.

When the voltage applied to the noninverting (+) input of comparator 56 exceeds the voltage applied to its inverting (−) input—the override mode of operation—the voltage at junction 54 is substantially equal to +12 volts. In this case, the upper driver 50 is deactivated to commutate transistor 22, and comparator 56 sources current to activate lower driver 52 for biasing transistor 24 conductive.

When the voltage applied to the noninverting (+) input is less than the voltage applied to its inverting (−) input—the normal mode of operation—the voltage at junction 54 is substantially at ground potential. In this case, lower driver 52 is deactivated to commutate transistor 24, and comparator 56 sinks current to activate upper driver 50 for biasing transistor 22 conductive. In each case, the respective resistors 64, 66 limit the gate current, the respective resistors 68, 70 discharge the transistor gate capacitance at turn-off, and the respective Zener diodes 72, 74 limit the gate-to-source voltage.

The input voltages of comparator 56 are developed so as to activate the override mode of operation whenever the bus voltage Vbus rises above a reference voltage Vref indicative of a fully charged battery, or whenever the MODE control signal developed by System Controller 40 assumes a logic one output state. The inverting (−) input is maintained at a reference voltage Vref determined by the Zener diode 80 and the voltage divider resistors 82 and 84. Resistor 86 limits the Zener diode current. The noninverting (+) input is normally maintained lower than the voltage reference Vref, by either a logic zero MODE control signal or a normal bus voltage.

The bus voltage Vbus is applied to the comparator input via voltage divider resistors 90, 92, and input resistors 94 and 96. The MODE control signal is connected to the junction 98 between input resistors 94, 96 via resistor 100. Thus, comparator output will rise to a high state to activate the override mode when (1) the bus voltage Vbus, as scaled by the divider resistors 90 and 92, rises above Vref, or (2) the MODE control signal is switched to a logic one state. The feedback resistor 102 provides hysteresis at the switch point.

The PWM Control Unit 42, described below in reference to FIG. 3, develops gate control signals for the inverter transistors 30A, 30A', 30B, 30B', 30C and 30C' on lines 110A, 110A', 110B, 110B', 110C and 110C', respectively, based on the rotor position information signals H1, H2, H3, a reference current signal Iref, a direction control signal F/R and a feedback current signal Ifb. The reference current and direction control signals Iref, F/R are developed by the System Controller 40, and the feedback current signal Ifb is developed by the Current Sense Circuit 44.

Figure 3:
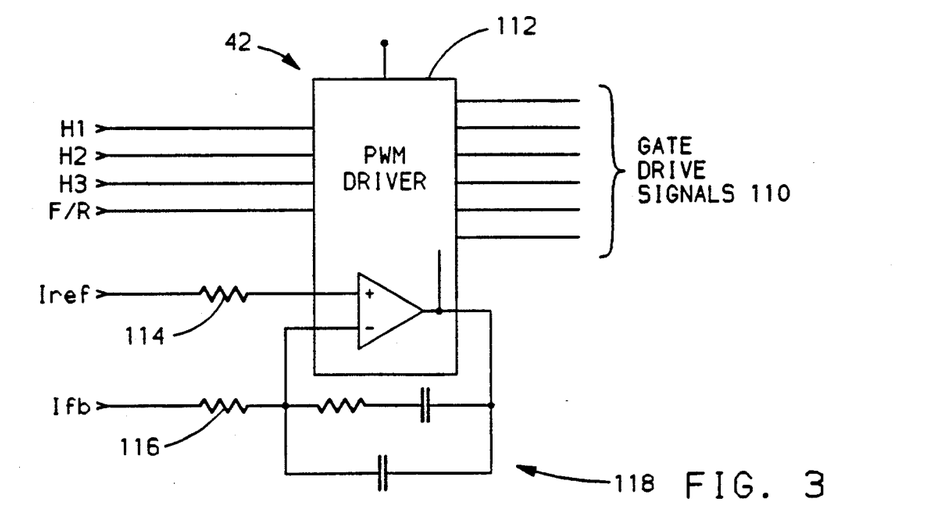
FIG. 3 is a circuit diagram of the PWM Control Unit of FIG. 1

Referring to FIG. 3, the PWM Control Unit comprises a conventional integrated circuit PWM Driver 112 such as the UC3625, manufactured by Unitrode Corporation, current signal input resistors 114, 116 and an RC feedback network 118. As schematically represented in FIG. 3, the PWM Driver 112 includes an internal error amplifier EA, to which the reference and feedback current signals Iref, Ifb are applied as inputs. The error amplifier output is used internally by the PWM Driver 112, and the RC network 118 provides proportional and integral feedback to establish a conventional Proportional-plus-Integral (PI) closed-loop PWM control of the motor current.

Figure 4:
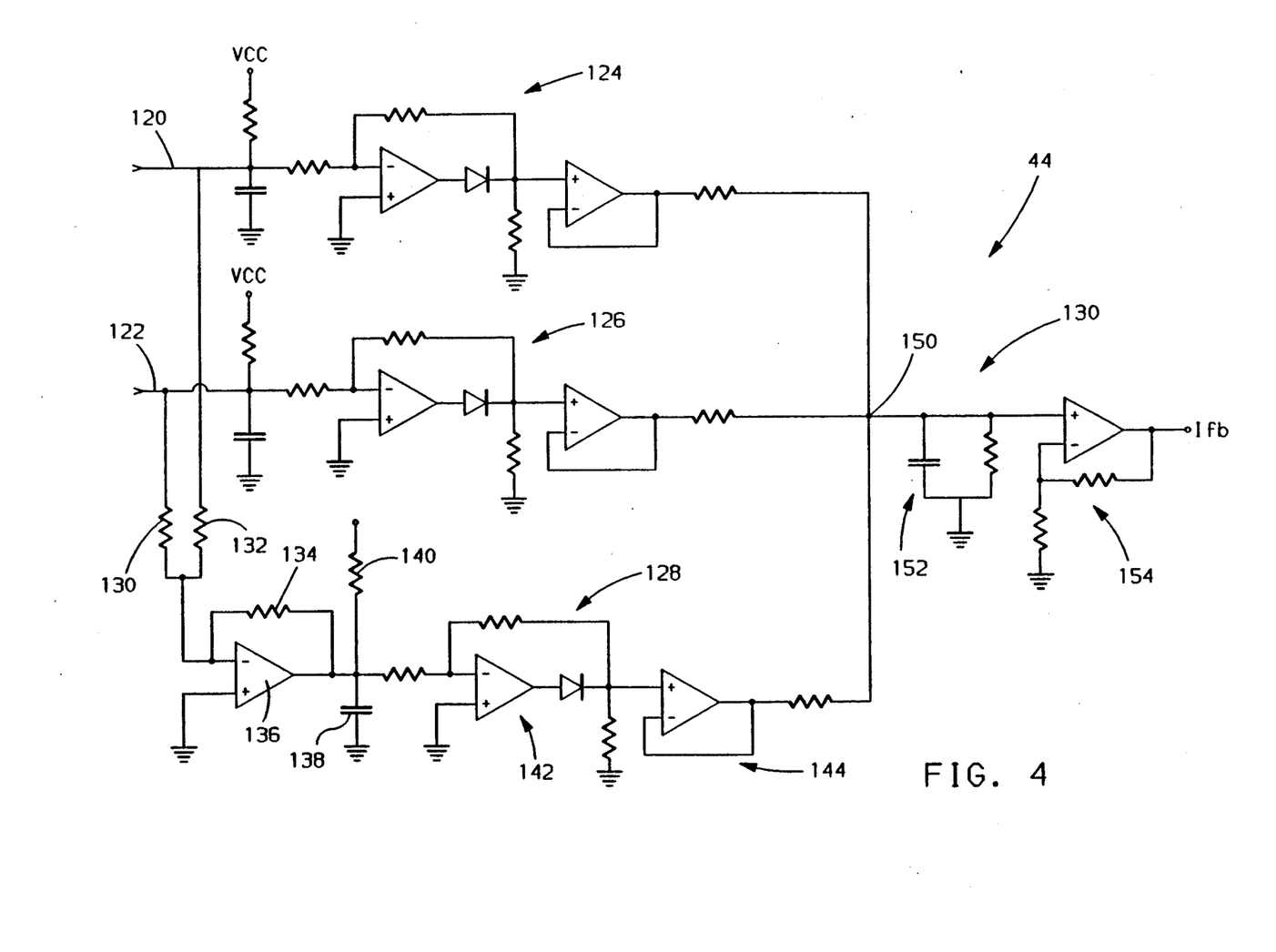
FIG. 4 is a circuit diagram of the Current Sense Circuit of FIG. 1.

The Current Sense Circuit 44, described below in reference to FIG. 4, is responsive to the winding current feedback signals developed by current transducers CTB and CTC on lines 120 and 122, respectively, and develops a motor current feedback signal Ifb corresponding to the average DC motor current. Referring to FIG. 4, the Current Sense Circuit 44 includes three identical phase current amplifier circuits, as generally designated by the reference numerals 124, 126 and 128. The input to amplifier circuit 124 is the phase-B current signal on line 120 from current transducer CTB and the input to amplifier circuit 126 is the phase-C current signal on line 122 from current transducer CTC. The input to amplifier circuit 128 is the phase-A current, derived as the negative sum of the phase-B and phase-C current signals, as developed by the resistors 130-134 and the operational amplifier 136.

Referring to the amplifier circuit 128 by way of example, each of the amplifier circuits 124-128 includes a filter capacitor 138, a pull-up resistor 140, a rectifying amplifier stage 142, and a unity gain amplifier stage 144. The outputs of the three amplifier circuits 124-128 are summed at junction 150, subjected to the low pass filter 152, and applied as an input to the final amplifier stage 154 to form the motor current feedback signal Ifb.

The computer-based System Controller 40 is responsive to the bus voltage Vbus, motor speed and direction signals W, DIR derived from the rotor position information signals H1-H3, the motor current feedback signal Ifb developed by Current Sense Circuit 44, and a number of system-related input signals as designated by the reference numeral 162. In an active or semi-active automotive suspension system, for example, the inputs 162 may include signals pertaining to vehicle speed, acceleration, braking effort, driver preference, etc.

Figure 5:
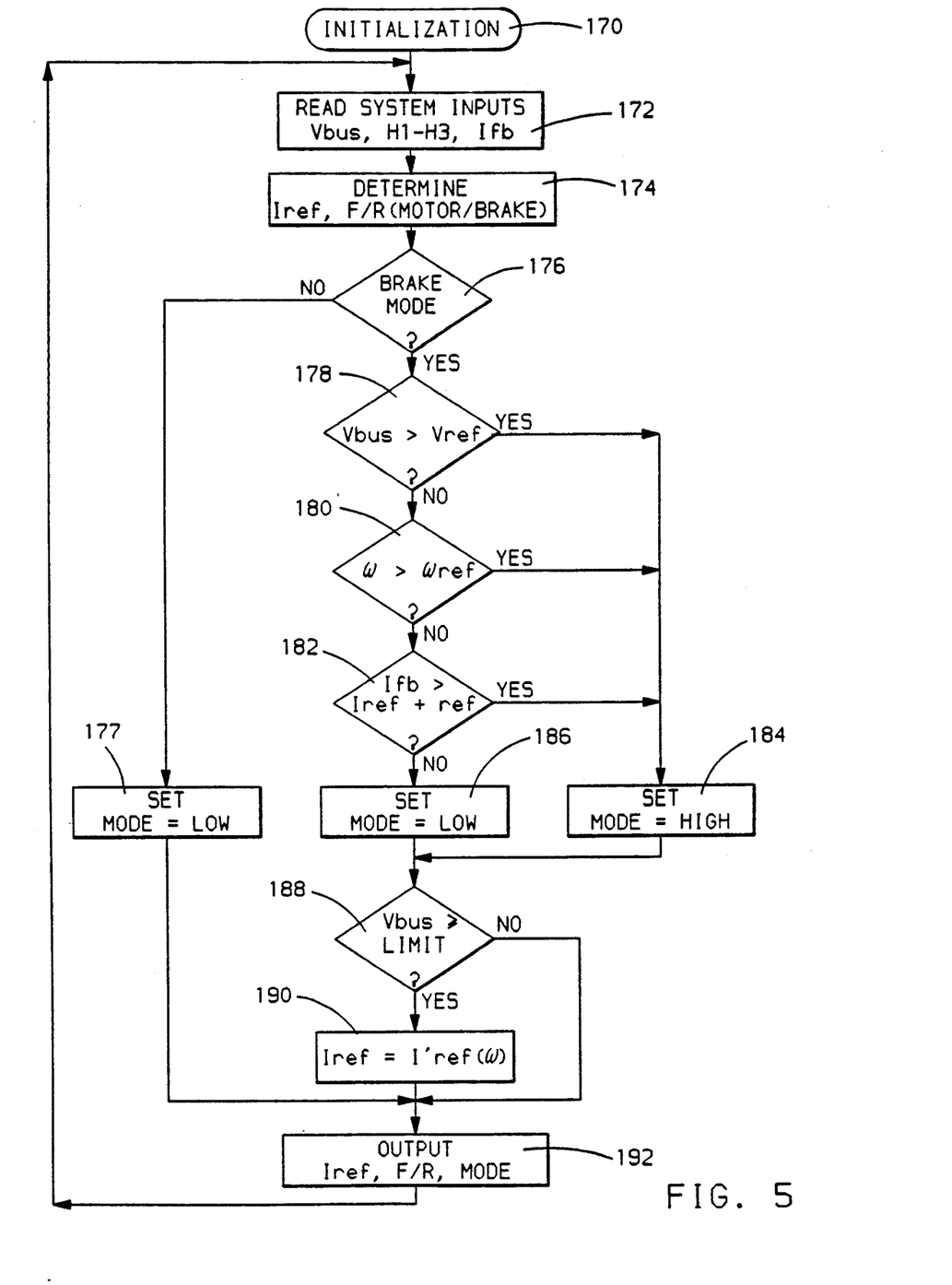
FIG. 5 is a flow diagram representative of computer program instructions executed by the computer based System Controller of FIG. 1.

The process by which the various inputs applied to System Controller 40 are developed into the proper MODE, reference current Iref and directional signals is outlined in the flow diagram of FIG. 5, which broadly represents computer program instructions executed by the System Controller in controlling the machine 10 according to this invention. The reference numeral 170 generally designates a series of initialization instructions executed at the beginning of each period of system operation for initializing various system parameters and program variables to predetermined settings. This would include, for example, setting the reference current to zero and setting the MODE control signal to a logic zero. Thereafter, the instructions blocks 172-192 are repeatedly executed as indicated by the flow diagram lines.

The block 172 is first executed to read the various inputs including the system inputs 162, Vbus, H1-H3, and Ifb. The motor speed W and direction DIR are derived from the position information signals H1-H3. Block 174 represents a system-specific algorithm for determining a desired current Iref and direction control signal F/R based on the motor direction DIR and the system inputs 162. As indicated, a Forward direction command (F) corresponds to a motoring mode of operation, while the Reverse direction command (R) corresponds to a braking mode of operation.

If the machine 10 is being operated in a motoring mode (that is, the direction command F/R is in the direction of motor rotation DIR), as determined at block 176, the blocks 177 and 192 are executed to set the MODE signal low for normal operation and to output the Iref, F/R and MODE signals. If the machine 10 is being operated in a braking mode (that is, the direction command F/R is opposite to the direction of motor rotation DIR), the blocks 178-192 are executed to set the state of the MODE control signal, and to fold back the reference current Iref if necessary to limit the bus voltage for the protection of the inverter transistors 30.

Block 178 determines if the bus voltage Vbus is greater than a reference corresponding to the reference Vref mentioned above in respect to FIG. 2. If so, the block 184 is executed to set the MODE control signal high, activating the override mode of operation upon execution of output block 192. This functionality is redundant to the functionality of the voltage comparison described above in reference to FIG. 2. That is, in the occurrence of a bus voltage in excess of Vref, both the MODE control signal and the Vbus signal could independently produce a state change of the comparator 56, resulting in activation of the override mode. If such redundancy is not deemed to be desirable, the comparator 56 may be eliminated, and the MODE control signal may be amplified and applied directly to the junction 54.

The block 180 determines if the derived motor speed W is greater than a reference speed $$Wref = Wo + K(Ifb)$$

where Wo is the no-load speed of machine 10 and K is a constant. If so, block 184 is executed as described above to set the MODE control signal high, activating the override mode of operation upon execution of output block 192.

Block 182 determines if the current error—that is (Iref - Ifb)—is more negative than a negative reference, -ref. In this condition, the motor speed, and hence, the induced motor voltage, is so high that the free-wheeling diodes 32 conduct continuously so that the motor braking current cannot be controlled by the PWM modulation of the inverter transistors 30. Alternatively, this condition could be detected by monitoring the voltage across individual free-wheeling diodes 32A', 32B' and 32C'. In any event, affirmative detection of the condition results in execution of the block 184 as described above to set the MODE control signal high, activating the override mode of operation upon execution of output block 192.

If blocks 178, 180 and 182 are all answered in the negative, block 186 is executed to set the MODE control signal low, restoring or maintaining the normal mode of operation in which the battery 20 is connected to the DC bus.

If the bus voltage Vbus reaches or exceeds an inverter limit voltage, LIMIT, as determined at block 188, the block 190 is executed to fold back the reference current Iref based on a limit condition reference current Iref' determined as a function of the motor speed W. This serves to protect the inverter transistors during high speed braking conditions.

Finally, the block 192 is executed to output the determined reference current Iref, direction control signal F/R, and MODE control signal. As indicated in reference to FIG. 1, the Iref and F/R signals are applied to the PWM Control Unit 42 and the MODE control signal is applied to the Mode Switch Driver 46.

Figure 6:
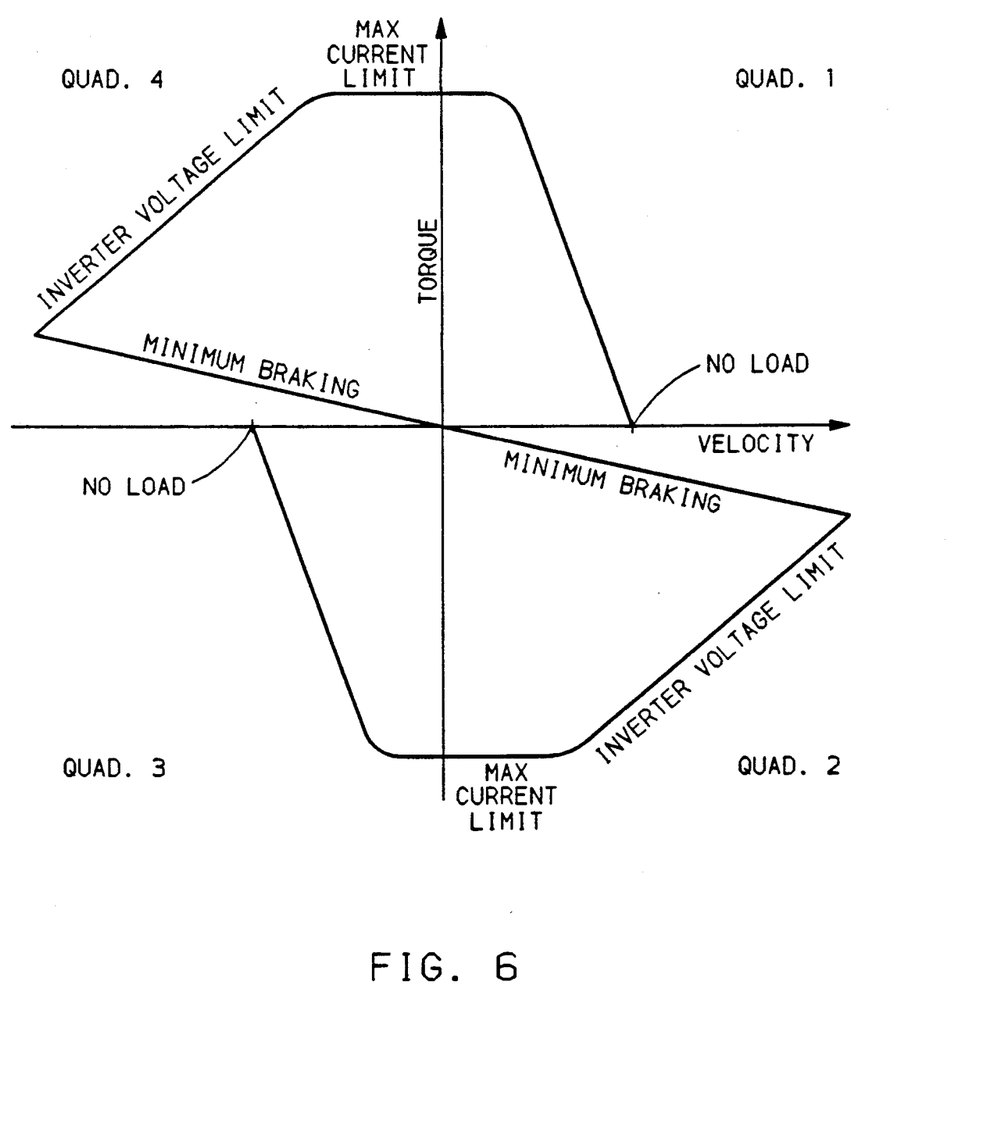
FIG. 6 is a plot of torque vs. velocity for the motor control system of FIG. 1.

FIG. 6 is a motor torque (force) vs. motor velocity plot which graphically depicts the operating limits of the above-described control. Motoring modes of operation occur when the generated force is in the direction of the motor velocity; that is, quadrants 1 and 3. Conversely, braking modes of operation occur when the generated force opposes the motor velocity; that is, quadrants 2 and 4. The various limits are best understood in connection with a description of the overall operation of the subject control.

In all motoring modes of operation (quadrants I and 3) the battery 20 is connected to the DC bus, and the inverter transistors 30 are modulated on and off by PWM Control Unit 42 to develop the required motor current, defined by Iref. In the context of a suspension system, this is referred to as creating an active force. The motor current, and hence the generated force, is limited at low velocity by the maximum current limit of the inverter, and at progressively higher velocities by the increasing magnitude of the induced voltage since the applied voltage must oppose the induced or back-EMF voltage. The no-load speed represents the maximum free-running speed of rotor 14.

In braking modes of operation (quadrants 2 and 4) with the battery 20 connected to the DC bus, braking force is developed by returning generated current to battery 20. At motor velocities below the no-load speed of the motor, the induced voltage is lower than the bus voltage Vbus, and respective inverter transistors 30 are modulated on and off so that the applied battery voltage aids the induced voltage. At each turn-off of the inverter transistors 30, the energy stored in the respective armature windings 12A-12C is returned to the battery 20 through respective free-wheeling diodes 32. This boost-converter operation can provide braking force down to zero motor velocity, although there is a net flow of energy out of the battery for motor velocities below a certain point.

To the extent that there is a net flow of energy into battery 20, the above-described braking operation is not available when the battery 20 is fully charged and cannot accept the charging current. As applied to a suspension system, this may occur during prolonged high energy damping. In the case of an electric vehicle powertrain, this may occur after charging or during a period of extended braking. In any event, the control of this invention activates the override mode of operation when the overcharged condition is detected, placing the load resistor 26 across the DC bus. In this mode, the battery 20 is functionally replaced by the energy exchange capacitor 28. The inverter transistors 30 may be modulated to control the braking current as described above, and the braking energy is dissipated by the load resistor 26.

Similar operation is observed in the event of an unexpected battery disconnect or a failure of the inverter transistor control circuits, once the braking current charges the capacitor 20 above the voltage reference Vref. In such event, the load resistor 26 provides a minimum braking torque, even with no modulation of the inverter transistors 30. In this condition, the return current path is entirely through the free-wheeling diodes 32, and the magnitude of the current is simply Vbus/R, where R is the resistance of load resistor 26. This characteristic is represented by the low current boundary in quadrants 2 and 4 of FIG. 6, it being recognized that Vbus is proportional to the motor velocity under this condition.

With battery 20 isolated, the bus voltage Vbus is allowed to rise to the level required to achieve the reference current Iref. If the bus voltage reaches a limit value chosen to protect the inverter transistors 30, the reference current is folded back to limit the bus voltage. This condition is represented by the inverter voltage limits in quadrants 2 and 4 of FIG. 6.

Override operation also occurs at motor velocities above the no-load speed of the motor, where the induced voltage is greater than the battery voltage. In this event, the braking current is returned to battery 20 through the free-wheeling diodes 32, and modulation of the inverter transistors 30 is ineffective to control the braking force. If the braking current exceeds the desired current Iref, the override mode is triggered to provide controlled braking force as described above.

While the control of this invention has been described in reference to the illustrated embodiment, it is expected that various modifications will occur to those skilled in the art. For example, the control may be applied to a two-quadrant control, to a DC motor controlled by a conventional H-switch, or even to an induction motor by operating as an induction generator with negative slip. The unifying operating characteristic of the control is that a single current regulator is used to achieve controlled motoring and braking, even at high velocities and even when the battery is fully charged. Obviously, the mode switching transistors 22 and 24 may be replaced with an electromagnetic relay or other switching device since these switches are not modulated to control the motor current. With the above and other modifications in mind, it should be understood that systems incorporating such modifications may fall within the scope of the present invention, which is defined by the appended claims.

The embodiments of the invention in which an exclusive property or privilege is claimed are defined as follows:

1. Control apparatus for a DC-fed motor control system, comprising:
    an electric machine having an armature winding;
    a rechargeable source of DC normally connected to a DC bus;
    DC bus switching means connecting the armature winding to the DC bus, including transistor means for supplying current to the armature winding from the DC bus, and rectifier means for returning current from the armature winding to the DC bus;
    current control means for modulating the transistor means (1) during a motoring mode of operation to control the current supplied to the armature winding, and (2) during a braking mode of operation to control the current returned to the DC bus;
    an energy exchange capacitor connected across the DC bus;
    a load resistor;
    mode switching means effective when activated to interrupt the connection of the source to the DC bus, and to connect the load resistor across the DC bus in parallel with the capacitor;
    sensing means effective during the braking mode of operation for detecting an operating condition for which the modulation of the transistor means is ineffective to control the current returned to the DC bus; and
    means for activating the mode switching means in response to the detection of said operating condition by the sensing means, whereafter the capacitor takes the place of the source, the current returned to the DC bus is supplied to the load resistor, and the modulation of said transistor means become effective to control such returned current.

2. The control apparatus of claim 1, including means to deactivate the mode switching means when said operating condition is no longer detected.

3. The control apparatus of claim 1, wherein the detected operating condition occurs when the rechargeable source is substantially fully charged and cannot accept the current returned to the DC bus.

4. The control apparatus of claim 3, where the sensing means detects the operating condition by comparing a DC bus voltage to a predetermined voltage corresponding to a substantially fully charged condition of said source.

5. The control apparatus of claim 1, wherein the detected operating condition occurs when the connection of said rechargeable source to said DC bus is interrupted other than by operation of said mode switching means, so that said source cannot accept the current returned to the DC bus.

6. The control apparatus of claim 5, where the sensing means detects the operating condition when the DC bus voltage exceeds a predetermined reference voltage greater than that of said source.

7. The control apparatus of claim 1, wherein the detected operating condition occurs when the motor speed is such that a voltage induced in the armature winding exceeds a DC bus voltage.

8. The control apparatus of claim 7, wherein the operating condition is detected when the current returned to said DC bus exceeds a desired current by more than a predetermined amount.

9. The control apparatus of claim 1, wherein the switching means comprises a first switch connecting said rechargeable source to said DC bus, and a second switch connecting said load resistor to said DC bus, the first and second switches having opposite conduction states.

10. The control apparatus of claim 1, wherein the current control means modulates the transistor means during the braking mode of operation to control the current returned to the DC bus to a desired current level, and the control apparatus further comprises foldback means effective when the DC bus voltage exceeds a predetermined limit voltage for reducing the desired current level to a value which limits the DC bus voltage at said predetermined limit voltage.

* * * * *